Jan. 13, 1931.　　　L. N. CRICHTON　　　1,788,986
ALTERNATING CURRENT DISTRIBUTION SYSTEM
Filed Jan. 10, 1929
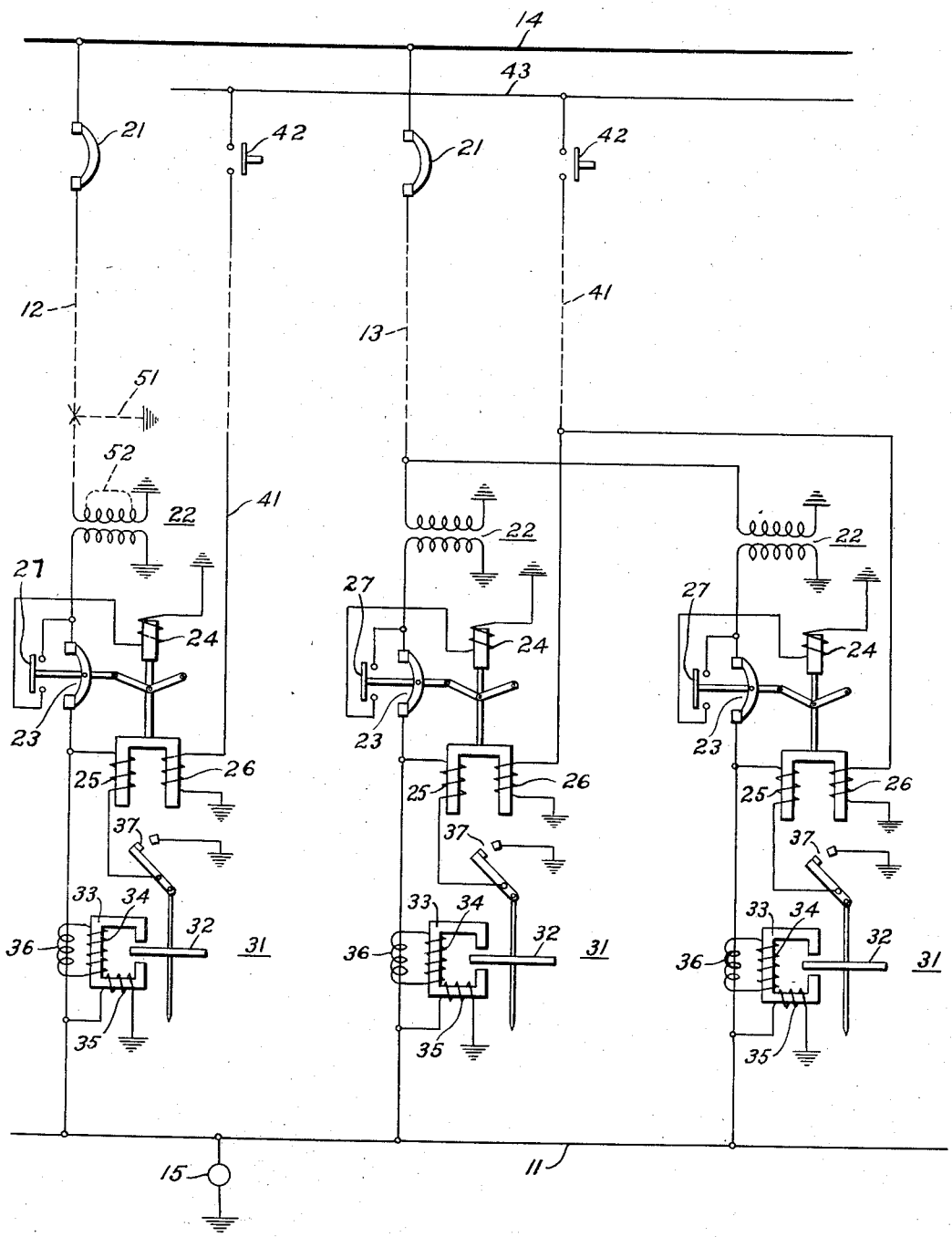
INVENTOR
Leslie N. Crichton.
BY
Wesley G. Carr
ATTORNEY Patented Jan. 13, 1931

1,788,986

UNITED STATES PATENT OFFICE

LESLIE N. CRICHTON, OF EAST ORANGE, NEW JERSEY, ASSIGNOR TO WESTINGHOUSE ELECTRIC & MANUFACTURING COMPANY, A CORPORATION OF PENNSYLVANIA

ALTERNATING-CURRENT-DISTRIBUTION SYSTEM

Application filed January 10, 1929. Serial No. 331,650.

This invention relates to systems of alternating-current distribution and particularly to systems of the low-voltage secondary network type energized from one or more high-tension feeders and having a switch or circuit-interrupter in each feeder to control the connection thereof to the secondary network or load circuit.

It is an object of my invention to provide in a system of the above type an improved and simplified means for controlling the opening and closing of the feeder switch or circuit-interrupter.

A further object of my invention is the provision, in a system of the above type, of means for controlling a feeder switch or circuit-interrupter which is of unusual simplicity and effective in operation.

In practicing my invention I provide a control means for the circuit-interrupter in each feeder circuit whereby the interrupters will close when the respective feeders are energized or connected to a source of power, and the interrupters will open automatically in response to a reverse-energy condition in the respective feeders or may be opened manually from a remote point by means of a pilot wire circuit.

The automatic opening or tripping function may be accomplished by a reverse energy relay of relatively simple design and preferably a relay having a relatively high reverse-current setting is employed to minimize "pumping" of the circuit interrupter.

A better understanding of this invention may be had by reference to the single figure of the drawing which is a diagrammatic view of a distribution system embodying my invention.

Referring to the drawing, a load circuit or network 11 is supplied with energy through a plurality of feeders 12 and 13 from a source of supply 14 which may be an ordinary power bus in the usual generating or substation. The source of supply 14 is illustrated as being the sole source for energizing the network 11, but in practice the network 11 may be energized from other and separate sources of alternating-current energy if desired.

The network 11 may be utilized to furnish energy to loads, such as the load 15, which may constitute either a lighting or a power load or both.

The system of alternating-current distribution illustrated in Fig. 1 is shown as single phase for simplicity although it may obviously be applied to any number of phases.

A plurality of feeder circuits, such as the feeder circuits 12 and 13, are illustrated, but inasmuch as they may be exact duplicates the feeder circuit 12 alone will be described in detail.

Disposed in each feeder circuit, as for example the feeder circuit 12, there is disposed a high-tension circuit interrupter 21 which is usually installed in the station adjacent to the bus 14 and a distribution transformer 22 the principal purpose of which is to step down the voltage of the power bus 14 to a value suitable for use in the network 11. The circuit interrupter 21 may be of any usual type equipped, preferably, with an excess-current tripping device.

Between the transformer 22 and the network 11 there is disposed a network-interrupter or network switch or circuit-interrupter 23 having a closing coil 24, trip coils 25 and 26, and an auxiliary or pallet switch 27 which is operable in accordance with the position of the interrupter.

The closing coil 24 is connected in series-circuit relation with the auxiliary switch 27 in the usual manner in order that the closing coil 24 may be energized only when the interrupter 23 is in open position. Thus, the closing coil 24 when energized may close the interrupter 23 and after the interrupter is latched into position by any suitable mechanism (not shown for purposes of clearness), the closing-coil circuit is opened by the auxiliary switch 27. It should be observed that the closing coil 24 is energized directly by the feeder-circuit voltage so that when the transformer 22 is energized, the closing coil 24 is likewise energized from the voltage associated therewith, assuming, of course, that the pallet switch 27 is closed.

The trip coils 25 and 26 of the circuit interrupter 23 are illustrated as independent coils either of which when energized to a predetermined degree will operate to trip or to open the interrupter 23. In this invention, therefore, there is provided a dual tripping means which will be described as follows.

Referring to the tripping circuit associated with the trip coil 25, it may be observed that the circuit is controlled by a relay 31 which is preferably of the induction type comprising a disc armature 32 controlled by an electromagnet 33 having a current winding 34 and a voltage winding 35 disposed thereon. The current winding 34 is energized from the feeder circuit 12 by means of a current transformer 36 preferably of saturable type in order to limit the values of current traversing the current winding. The voltage winding 35 is preferably energized by the network voltage as illustrated. The current winding 34 and the voltage winding 35 cooperate to cause the rotation of the disc 32 in a direction according to the direction of current traversing the current transformer 36. In other words, the relay 31 is responsive to the magnitude and phase position of current traversing the interrupter 23, or stated differently, it is responsive to the direction of such current.

When the current is in a reverse direction, namely, from the network 11 toward the transformer 22, and of sufficient magnitude, the disc 32 is actuated in a direction to close the contact members 37 controlled thereby and thereby energizes the trip coil 25 to trip or open the circuit interrupter 23.

The relay 31 is preferably adjusted to respond to a relatively high reverse-current value only in order to prevent "pumping", as hereinafter brought out in greater detail.

The network switch or interrupter 23 may also be tripped by the coil 26 which may be energized from a pilot conductor 41 connected to a control source or bus 43. A manually operable switch 42 is disposed in the pilot conductor, preferably at the generating station or substation, for controlling the energization of the trip coil 26. The control switch 42, when closed by the station operator, thereby effects the opening of the interrupter 23.

It may be observed that one transformer only, namely the transformer 22, is illustrated as being connected in the feeder 12. However, according to well-known practice and as illustrated in the case of the feeder circuit 13, other transformers may be paralleled with the transformer 22 and connected between the circuit interrupter 21 and the network 11. Such circuits may be exact duplicates of the apparatus heretofore described, and further description thereof is deemed unnecessary. Obviously in such case the trip coils 26 of the circuit interrupters 23 associated with any of the transformers 22 will be connected in parallel with each other so that the energization of the pilot-wire circuit 41 will trip all of the network interrupters 23 associated with that feeder.

A description of operation will now be presented with reference to the feeder circuit 12 and its associated apparatus.

Assuming that the power bus 14 is energized and that it is desired to close the circuit-interrupter 23, the station operator may close the circuit interrupter 21 which will effect the connection of the bus 14 to the primary of the transformer 22. The circuit interrupter 23 being open, the pallet switch 27 is closed and the closing coil 24 of the interrupter 23 becomes immediately energized by the transformer secondary voltage. Thereupon the interrupter 23 closes and latches, and after it has latched, or simultaneous therewith, the pilot switch 27 opens and breaks the circuit of the closing-coil 24. The circuit interrupter 23 will thereafter remain closed so long as the voltage and phase conditions of the feeder circuit with respect to the network 11 are such as to insure a delivery of energy from the transformer to the network.

Assuming that the network 11 is energized from a plurality of feeder circuits, as for example the feeder circuits 12 and 13, and that the network is furnishing energy to the various loads connected thereto, as for example, the load 15, if a short circuit now occurs relative to the network 11, as distinguished from a feeder fault condition, the fault will be permitted to burn itself clear in accordance with the usual practice. Since all of the feeders supply energy to the fault, the feeder currents will be in the normal direction and the relays 31 will not operate to trip the respective interrupters 23.

The interrupters 21 may be provided with means responsive to an excess current for opening them, but inasmuch as the secondary fault is being fed by a plurality of feeders, the fault currents will be widely distributed and the current in any one feeder will be of a magnitude less than the value required to trip the circuit interrupter 21 in any one feeder.

If a high-tension fault condition occurs relative to any feeder, such as the fault 51 relative to the feeder 12, or the fault 52 relative to the transformer 22, or a fault anywhere in the feeder circuit 12 between the current transformer 36 and the bus bar 14, it is desirable that the interrupters 21 and 23 open, in accordance with the various time settings for the respective breakers, and thus isolate the faulty feeder 12 from the network 11.

It is clear that a fault condition 51, for example, will cause a reverse current in the feeder 12, or stated differently, the current to the fault 51 will be fed from the network 11 and being of substantial magnitude will cause the relay 31 to close its contact 37 thereby energizing the trip coil 25 and opening the interrupter 23.

Also the fault 51 or 52 will cause an excess current to be fed from the bus bar 14 over the feeder 12 which will cause the interrupter 21 to open by reason of its excess current tripping device. A fault condition relative to the feeder 12 will, therefore, disconnect the feeder at both ends thereof and permit the necessary repairs to the feeder. Upon the disconnection of the feeder 12, however, the network 11 will continue to be energized from the feeder 13.

As above mentioned, the relays 31 are set or adjusted to respond to relatively high values of reverse-current only, and thereby prevent pumping of the network switch 23. By pumping is meant a periodic opening and closing of the network switch 23 or an undesirable opening of such switch in the absence of a faulty condition relative to the associated feeder 12. For example, the operator may close the circuit interrupter 21 thereby causing the closure of the remotely located network interrupter 23. At the same time the voltage and phase conditions on both sides of the interrupter 23 may be such as to produce a reverse current of relatively small magnitude which, if the relay 31 were not adjusted to respond only to high values of current, would immediately open the interrupter 23 in an undesirable manner. Such reverse current might be caused, for example, by an improper position of the voltage regulators associated with the feeder 12 or a reverse current of leading phase characteristics might be caused by a lagging phasing voltage. No matter what the cause, a reverse current of small magnitude would undesirably reopen the interrupter 23 but for the provision of a high-reverse current setting of the relay 31.

Attention is also directed to the fact that the station operator may open the remotely disposed interrupter 23 at will by simply closing the pilot-wire control switch 42 thereby energizing the trip coil 26 and tripping the interrupter 23. Thus the connection and disconnection of feeder circuits may be controlled at the station at the will of the operator thereof, and also fault conditions relative to any feeder are automatically isolated.

Special attention is directed to the simplicity of this system and also to the following features:

In accordance with my invention, therefore, I have provided a network interrupter and control therefor comprising a closing coil responsive to the feeder voltage only, and a tripping means is responsive to excess reverse currents only and not sensitive to relatively small values of such reverse currents. Further, an additional tripping means is provided whereby the interrupter may be opened from a remote point, and, preferably at the will of the station operator.

Although I have shown and described specifically a relay of the inductive type for controlling the operation of the interrupters 23 in response to a reverse current condition, obviously other means may be employed for this purpose such, for example, as a circuit interrupter provided with windings which become effective to open the interrupter upon the occurrence of a reverse-energy condition in the feeder.

Such changes and modification which may be made by those skilled in the art are to be construed as within the scope of the appended claims, except such limitations as may be imposed by the prior art.

I claim as my invention:

1. In combination, a plurality of feeder circuits for energizing a common network load circuit, each feeder circuit including a high-voltage circuit interrupter, a distribution transformer connected between the high-voltage interrupter and the network, a network interrupter connected between the transformer and the network, and network interrupter control means including closing means responsive to the feeder circuit voltage only and opening means responsive to the magnitude and phase position of currents of substantial magnitude only traversing the network interrupter and opening means responsive to the energization of an associated pilot wire.

2. In combination, a plurality of feeder circuits for energizing a common network load circuit, each feeder circuit including a high-voltage interrupter, a transformer connected between said interrupter and the network, a network interrupter connected between the transformer and the network, and network interrupter-control means including closing means responsive to the feeder circuit voltage only and opening means of one type responsive to reverse currents of a relatively large magnitude only traversing said interrupter and to the phase position of said currents and of another type responsive independently to energization of an associated pilot wire.

3. In combination, a plurality of feeder circuits for energizing a common network load circuit, each feeder circuit including a high-voltage circuit interrupter, a distribution transformer connected between the high-voltage interrupter and the network, a network interrupter connected between the transformer and the network, and network interrupter control means including closing means responsive to the feeder circuit voltage only and opening means responsive to the magnitude and phase position of currents of substantial magnitude only traversing the network interrupter.

4. In combination, a plurality of feeder circuits for energizing a common network load circuit, each feeder circuit including a high-voltage interrupter, a distribution transformer connected between the high-voltage interrupter and the network, a network interrupter connected between the transformer and the network, and network interrupter-control means including closing means responsive to the feeder circuit voltage only and opening means responsive to reverse currents of a relatively large magnitude only and to the phase position of such currents traversing the network interrupter.

5. In combination, a plurality of feeder circuits for energizing a common network load circuit, each feeder circuit including a high-voltage circuit interrupter, a distribution transformer connected between the high-voltage interrupter and the network, a network interrupter connected between the transformer and the network, and network interrupter control means including closing means responsive to the feeder circuit voltage only and including opening means having a reverse current tripping means and an independently controlled tripping means in a pilot-wire circuit.

6. In an alternating-current network system of distribution, the combination of a plurality of feeder circuits for energizing a common network load, each feeder being provided with a high-voltage interrupter located in a central station, a step-down transformer between said high-voltage interrupter and said network, a network interrupter connected between the transformer and the network, and network-interrupter control means including means whereby a central station operator may control the opening and closing of said network interrupter, and means for opening said network interrupter on the occurrence of a flow of reverse energy of substantial magnitude only.

7. In an alternating-current network system of distribution including a network load energized from a central station through a plurality of feeders, each feeder circuit including a high-voltage interrupter in the central station, a step-down transformer between said interrupter and the network load, a network interrupter connected between the transformer and network load, network-interrupter control means for effecting both the closing and opening of said network interrupter by a central station operator, and means for opening said network interrupter on the occurrence of a flow of reverse energy of substantial magnitude only.

In testimony whereof, I have hereunto subscribed my name this 7th day of January, 1929.

LESLIE N. CRICHTON.